(12) United States Patent
Maegawa et al.

(10) Patent No.: US 8,902,216 B2
(45) Date of Patent: Dec. 2, 2014

(54) INFORMATION PROVIDING SYSTEM, PROVIDING INFORMATION UPDATING METHOD, INFORMATION TERMINAL DEVICE, INFORMATION TERMINAL DEVICE CONTROL METHOD, INFORMATION UPDATING SERVER, INFORMATION UPDATING SERVER CONTROL METHOD AND INFORMATION MEMORIZING MEDIUM

(75) Inventors: Hirotoshi Maegawa, Tokyo (JP); Hiroki Kato, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 858 days.

(21) Appl. No.: 12/161,011

(22) PCT Filed: Nov. 22, 2006

(86) PCT No.: PCT/JP2006/323329
§ 371 (c)(1),
(2), (4) Date: Sep. 12, 2008

(87) PCT Pub. No.: WO2007/080711
PCT Pub. Date: Jul. 19, 2007

(65) Prior Publication Data
US 2010/0156891 A1    Jun. 24, 2010

(30) Foreign Application Priority Data
Jan. 16, 2006    (JP) .................................. 2006-008089

(51) Int. Cl.
*G06T 15/00* (2011.01)
*G06F 15/16* (2006.01)
*A63F 13/30* (2014.01)
*H04L 29/06* (2006.01)
*H04L 29/08* (2006.01)

(52) U.S. Cl.
CPC ................ *A63F 13/12* (2013.01); *H04L 67/38* (2013.01); *A63F 2300/5533* (2013.01); *H04L 67/104* (2013.01); *H04L 67/1063* (2013.01)
USPC ............ 345/419; 709/217; 709/218; 709/219

(58) Field of Classification Search
CPC .......................... G06Q 30/02; A63F 2300/513
USPC ......................................................... 345/419
See application file for complete search history.

(56) References Cited

U.S. PATENT DOCUMENTS
2003/0156135 A1* 8/2003 Lucarelli ........................ 345/757
2004/0261013 A1* 12/2004 Wynn et al. .................... 715/511
(Continued)

FOREIGN PATENT DOCUMENTS
JP    2005242639         9/2005
JP    2005242639 A       9/2005

OTHER PUBLICATIONS
Takuji Iimura, Hiroaki Hazeyama, and Youki Kadobayashi. 2004. Zoned federation of game servers: a peer-to-peer approach to scalable multi-player online games. In Proceedings of 3rd ACM SIGCOMM workshop on Network and system support for games (NetGames '04). ACM, New York, NY, USA, 116-120.*

(Continued)

*Primary Examiner* — Kee M Tung
*Assistant Examiner* — Zhengxi Liu
(74) *Attorney, Agent, or Firm* — Katten Muchin Rosenman LLP

(57) ABSTRACT

Provided is an information providing system that is capable of precisely grasping actual situations of use of provided information and effectively updating the provided information. A space management server (12) includes a unit for transmitting a part of space information indicating a structure of virtual 3-dimensional space to a user device (28). The user device (28) includes a unit for receiving the part of the space information, a unit for sharing the part of the space information with another user device (28), a unit for acquiring user information of the other information terminal device, and a unit for outputting the acquired user information and part specifying information for specifying the part of the space information.

10 Claims, 3 Drawing Sheets

(56) References Cited

U.S. PATENT DOCUMENTS

2005/0054447 A1* 3/2005 Hiroyama et al. .............. 463/42
2005/0266925 A1* 12/2005 Hornell et al. .................. 463/42
2006/0135232 A1* 6/2006 Willis .............................. 463/1
2006/0168107 A1* 7/2006 Balan et al. ................... 709/218

OTHER PUBLICATIONS

Shen, Zhiqi, Chunyan Miao, and Yundong Cai. "Agent Augmented Game Development." (2004).*

Japanese Notice of Rejection, dated Dec. 21, 2010, from the corresponding Japanese Patent Application No. 2006-008089, with partial English-language translation thereof.

Katsumi Hosoya, et al., "Interactive Cooperation Educational System based on Virtual Shared Space: HyCLASS", Aug. 10, 1997, pp. 825-832, vol. 46, Publisher: NTT R&D (JP), with partial English-language translation of Japanese Notice of Rejection dated Dec. 21, 2010 from the corresponding Japanese Patent Application No. 2006-008089.

Hiroaki Harada, et al., "A Three-Dimensional Virtual Community Based on Space-Sharing Architecture" The Transactions of the Institute of Electronics, Information and Communication Engineers D-II, May 25, 1998, pp. 972-981, vol. J81-D-II, Publisher: The Institute of Electronics, Information and Communication Engineers (JP), with partial English-language translation of Japanese Notice of Rejection dated Dec. 21, 2010 from the corresponding Japanese Patent Application No. 2006-008089.

Notice of Rejection dated Mar. 29, 2011, from corresponding Japanese Application No. 2006-008089.

International Search Report, dated Feb. 13, 2007, from the corresponding PCT/JP2006/323329.

International Preliminary Report on Patentability dated Jul. 22, 2008 from the corresponding PCT/JP2006/323329.

Hiroaki Harada et al., "Ba no Kyoyu Architecture ni Motozuku 3 Jigen Kaso Kukan Community", The transactions of the Institute of Electronics, Information and Communication Engineers, vol. J81-D-II, No. 5, May 25, 1998, pp. 972 to 981.

Katsumi Hosoya et al., "Kaso Kukan o Riyo Shita Taikengata Kyocho Gakushu System: NyCLASS", NTT R&D, vol. 46, No. 8, Aug. 10, 1997, pp. 825 to 832.

* cited by examiner

INFORMATION PROVIDING SYSTEM, PROVIDING INFORMATION UPDATING METHOD, INFORMATION TERMINAL DEVICE, INFORMATION TERMINAL DEVICE CONTROL METHOD, INFORMATION UPDATING SERVER, INFORMATION UPDATING SERVER CONTROL METHOD AND INFORMATION MEMORIZING MEDIUM

TECHNICAL FIELD

The present invention relates to an information providing system, a provided information updating method, an information terminal device, a control method for an information terminal device, an information updating server, a control method for an information updating server, and an information storing medium.

BACKGROUND ART

In an information providing system for transmitting various items of information to an information terminal device via a network, provided information may be updated afterward. For example, when information of a virtual 3-dimensional space is transmitted to the information terminal device, an advertisement object is added and arranged in the virtual 3-dimensional space, or a new space is added afterward.

DISCLOSURE OF THE INVENTION

Problem to be Solved by the Invention

However, when there is a great amount of provided information, unless which part thereof is used by which user group is precisely grasped, significant updating of the provided information is difficult. For example, when a certain part of the provided information is used by the young, addition of information directed for the young to other parts is meaningless or inefficient.

The present invention has been developed to deal with the aforementioned problem, and it is an object of the invention to provide an information providing system capable of precisely grasping actual situations of use of provided information and effectively updating provided information, a provided information updating method, an information terminal device, a control method for an information terminal device, an information updating server, a control method for an information updating server, and an information storing medium.

Means for Solving the Problem

In order to solve the problem described above, an information providing system according to the present invention includes: an information management server; and an information terminal device. In the information providing system, the information management server includes partial provided information transmitting means for transmitting a part of provided information to the information terminal device, and the information terminal device includes: partial provided information receiving means for receiving the part of the provided information transmitted by the partial provided information transmitting means; information sharing means for sharing the part of the provided information with another information terminal device; user information acquiring means for acquiring user information of the another information terminal device; and information outputting means for outputting the user information acquired by the user information acquiring means and part specifying information for specifying the part of the provided information.

According to the present invention, the information terminal device receives a part of the provided information from the information management server to share it with the other information terminal device. Then, the information terminal device acquires user information of the information terminal device which shares the part of the provided information, and outputs this user information together with part specifying information for specifying the shared part of the provided information. The provided information may be, for example, information of a virtual 3-dimensional space. The user information may also be information indicating user attributes (e.g., age, sex, and address of a user). According to the present invention, the provided information can be effectively updated by using these items of information.

Further, according to one aspect of the present invention, the information sharing means transmits the part of the provided information to the other information terminal device. Thus, the part of the provided information can be shared among the information terminal devices without imposing any loads on the information management server. Further, according to the present invention, a plurality of the information terminal devices may be included, and the plurality of the information terminal devices may constitute a peer-to-peer (P2P) network.

Further, according to another aspect of the present invention, the information providing system further includes an information updating server for receiving the user information and the part specifying information outputted from the information outputting means, and requesting updating of the provided information according to contents of the user information and the part specifying information. Thus, loads on the information management server can be reduced more.

Further, according to the present invention, a provided information updating method for an information providing system which includes an information management server for managing provided information, and an information terminal device, includes: a partial provided information transmitting step of transmitting, by the information management server, a part of the provided information to the information terminal device; a partial provided information receiving step of receiving, by the information terminal device, the part of the provided information from the information management server; an information sharing step of sharing, by the information terminal device, the part of the provided information with another information terminal device; a user information acquiring step of acquiring, by the information terminal device, user information of the another information terminal device; an information outputting step of outputting, by the information terminal device, the user information and part specifying information for specifying the part of the provided information; and an information updating step of updating, by the information management server, the provided information according to contents of the part specifying information and the user information outputted from the information terminal device.

According to the present invention, the information terminal device receives a part of the provided information from the information management server to share it with another information terminal device. Then, the information terminal device acquires user information of the information terminal device which shares the part of the provided information, and outputs this user information together with part specifying information for specifying the shared part of the provided information. According to the present invention, the provided information can be effectively updated by using these items of information.

Further, an information terminal device according to the present invention includes: partial provided information receiving means for receiving a part of provided information from an information management server; information sharing means for sharing the part of the provided information with another information terminal device; user information acquiring means for acquiring user information of the another information terminal device; and an information outputting means for outputting the user information acquired by the user information acquiring means and part specifying information for specifying the part of the provided information.

Further, a control method for an information terminal device according to the present invention includes: a partial provided information receiving step of receiving a part of provided information from an information management server; an information sharing step of sharing the part of the provided information with another information terminal device; a user information acquiring step of acquiring user information of the another information terminal device; and an information outputting step of outputting the user information acquired in the user information acquiring step and part specifying information for specifying the part of the provided information.

Further, an information storing medium according to the present invention is an information storing medium stored with a program for controlling a computer to function as: partial provided information receiving means for receiving a part of provided information from an information management server; information sharing means for sharing the part of the provided information with another information terminal device; user information acquiring means for acquiring user information of the other information terminal device; and an information outputting means for outputting the user information acquired by the user information acquiring means and part specifying information for specifying the part of the provided information. The computer is, for example, a personal computer, a server computer, a home video game machine, an arcade video game machine, a portable game machine, a portable information terminal device, or the like (the same applies hereinafter). The information storing medium may be various information storing media such as a CD-ROM or a DVD-ROM (the same applies hereinafter).

Further, an information updating server according to the present invention is configured to: receive a part of provided information from an information management server; receive, from an information terminal device which shares the part of the provided information with another information terminal device, user information of the other information terminal device and part specifying information for specifying the part of the provided information; and request the information management server to update the provided information according to contents of the user information and the part specifying information.

Further, according to the present invention, a control method for an information updating server includes the steps of: receiving a part of provided information from an information management server; receiving, from an information terminal device which shares the part of the provided information with another information terminal device, user information of the other information terminal device and part specifying information for specifying the part of the provided information; and requesting the information management server to update the provided information according to contents of the user information and the part specifying information.

An information storing medium according to the present invention is an information storing medium stored with a program for controlling a computer to: receive a part of provided information from an information management server; receive, from an information terminal device which shares the part of the provided information with another information terminal device, user information of the other information terminal device and part specifying information for specifying the part of the provided information; and request the information management server to update the provided information according to contents of the user information and the part specifying information.

BEST MODE FOR CARRYING OUT THE INVENTION

Hereinafter, an embodiment of the present invention will be described in detail with reference to the drawings.

Figure 1:
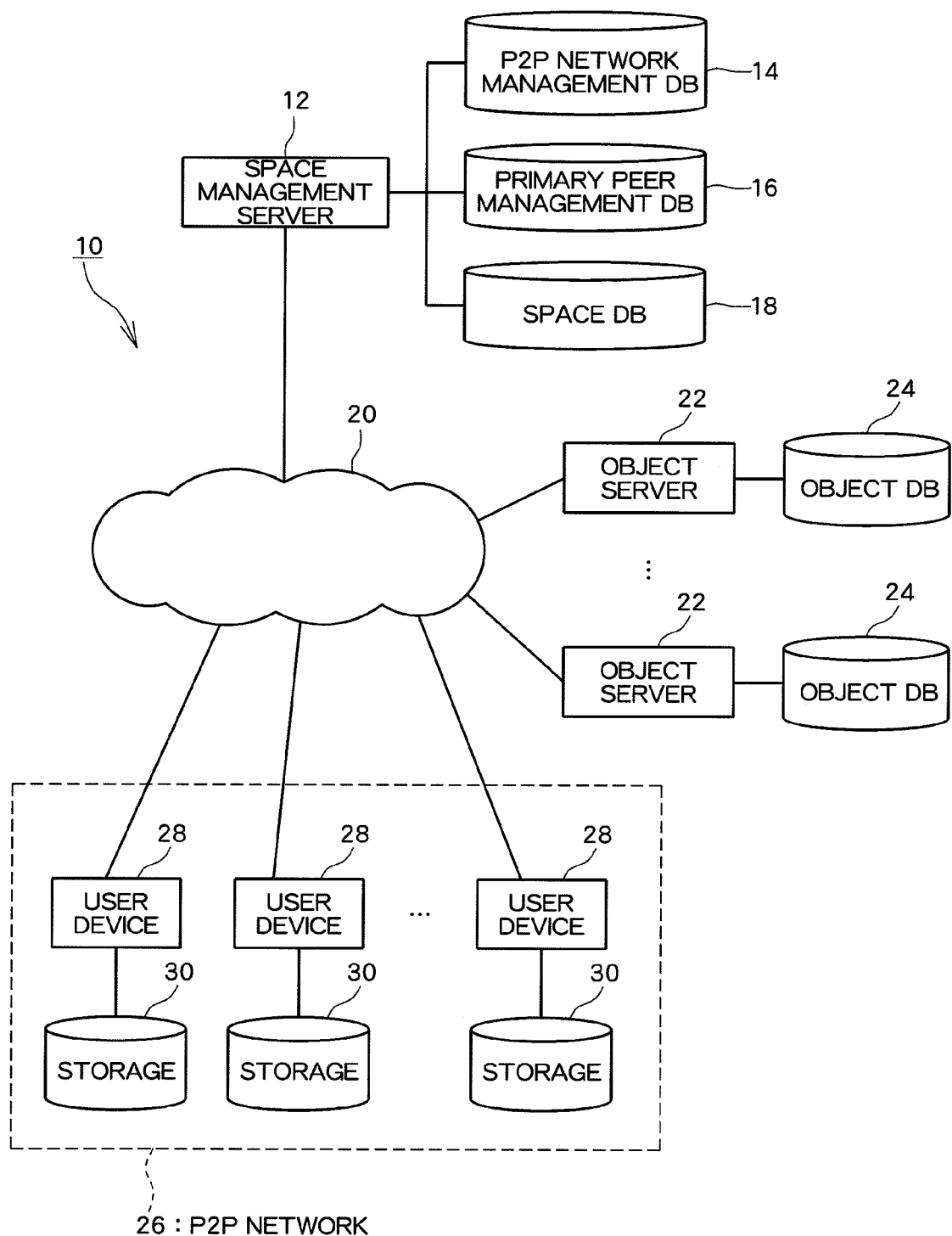
FIG. 1 A diagram illustrating an overall configuration of an information providing system according to an embodiment of the present invention.

FIG. 1 illustrates an overall configuration of an information providing system according to the embodiment of the present invention. As shown in the figure, in this information providing system 10, a space management server 12 (information management server), a plurality of object servers 22 (information updating servers), and a plurality of user devices 28 (information terminal devices) are connected to a communication network 20 such as the Internet to transmit/receive data with one another.

According to the information providing system 10, a part of space information of broad virtual 3-dimensional space (information of a position of each object arranged in the virtual 3-dimensional space) is transmitted to the user device 28, and the user device 28 can display an image of the part of the virtual 3-dimensional space based on this information. In this case, information of a shape or a pattern of each object arranged in the virtual 3-dimensional space is transmitted from the object server 22. The user devices 28 constitute a peer-to-peer (P2P) network 26. Information which a certain user device 28 has received from the space management server 12 or the object server 22 is stored in a storage 30 of the user device 22, and can be directly shared among the user devices 28 without passing through the space management sever 12 or the object server 22. In other words, another user device 28 that needs information stored in the storage 30 of a certain user device 28 can receive the stored information through transfer. In this case, the user device 28 that transmits information stored in its own storage 30 receives user information of a user device 28 of transmission destination, for example, various attributes such as an age, a sex, and an address of a user, from the user device 28 to store it in the storage 30. Then, in response to an inquiry from the object server 22, the user device 28 returns user information received from the user device 28 which shares the same part of space information in the P2P network 26, and part specifying information to specify the part (e.g., ID added to the part, or coordinates in an area of the virtual 3-dimensional space corresponding to the part). Based on these items of information, the object server 22 judges whether to change the virtual 3-dimensional space (add space or change space (addition of object)), and requests the space management server 12 to change the virtual 3-dimensional space when necessary.

With this configuration, by taking into consideration user information of the users who share the same part of space information of the broad virtual 3-dimensional space, the space can be changed. In other words, which community of users uses a certain part of the virtual 3-dimensional space is grasped, and this information can be used for changing the space.

The space management server 12 is configured by using, for example, a well-known server computer, and each function of the space management server 12 is realized by executing a program according to the embodiment. A P2P network management database 14, a primary peer management database 16, and a space database 18 constituted of various storage devices such as hard disks are connected to the space management server 12. The P2P network management database 14 stores addresses of the user devices 28 which constitute the P2P network 26. The space database 18 stores space information. The primary peer management database 16 stores an address of a user device 28 (primary peer) which has downloaded a part of the space information stored in the space database 18, and part specifying information to specify the part.

As in the case of the space management server 12, the object server 24 is configured by using, for example, a well-known server computer, and each function of the object server 24 is realized by executing a program according to the embodiment. Object databases 24 constituted of various storage devices such as hard disks are connected to the object servers 24. The object database 24 stores data regarding a shape or a pattern of an object arranged in the virtual 3-dimensional space.

On the other hand, the user device 28 is configured by using a personal-use computer such as a personal computer or a home video game machine. Each function of the user device 28 is realized by executing a program according to the embodiment via the computer. Also, the storages 30 constituted of various storage devices such as hard disks are connected to the user devices 28. The storage 30 stores a part of space information downloaded from the space database 18 or received from the other user device 28. Then, when a part of the space information is downloaded from the space database 18, user information of the user device 28 which shares the information is stored. This information is, as described above, provided to the object server 22 when necessary to be referred to when the space information is changed.

Hereinafter, configurations of the space management server 12, the user device 28, and the object server 22 will be described more in detail.

Figure 2:
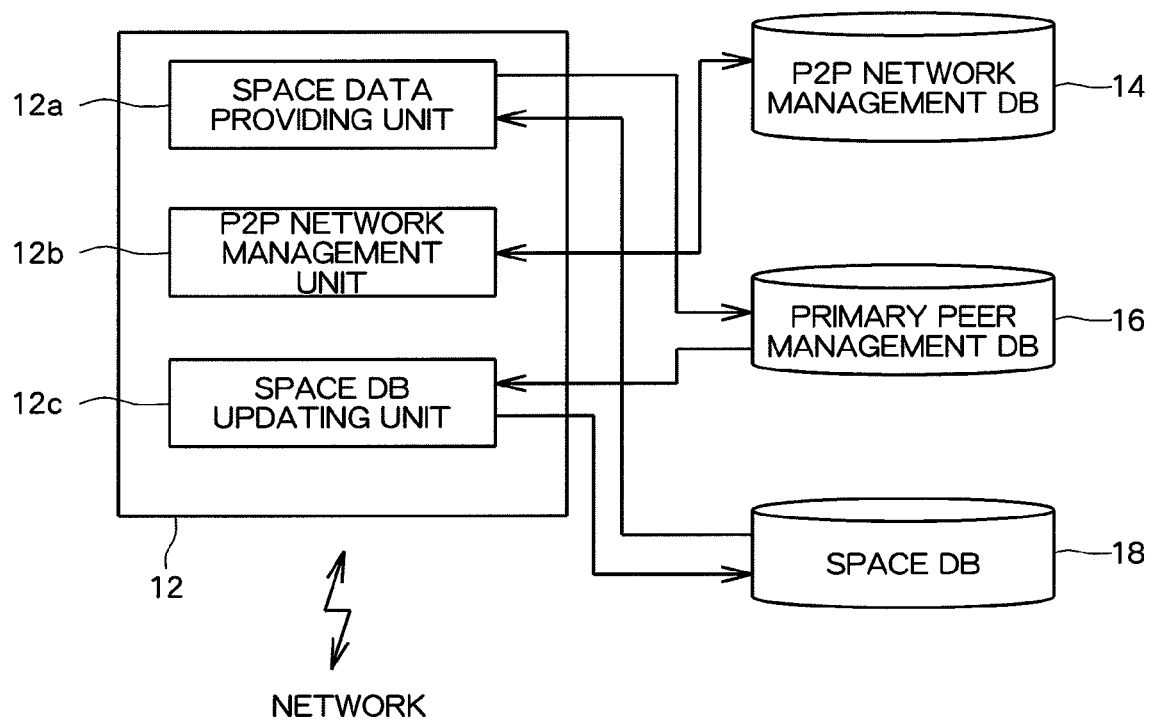
FIG. 2 A diagram illustrating a configuration of a space management server (information management server).
Figure 3:
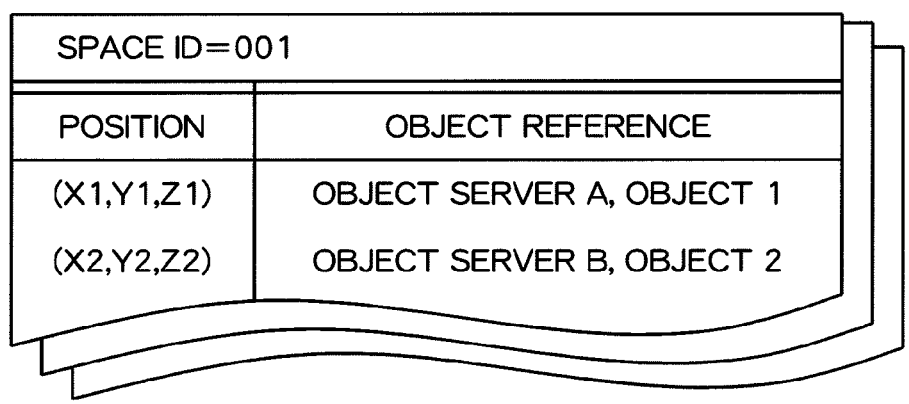
FIG. 3 A diagram schematically illustrating contents of a space database.

FIG. 2 is a functional block diagram of the space management server 12. As shown in the figure, the space management server 12 functionally includes a space data providing unit 12a, a P2P network management unit 12b, and a space database updating unit 12c. In response to a request from the user device 28, the space data providing unit 12a reads a part of space information from the space database 18 to transmit it. The part of the space information to be transmitted may be specified by the request from the user device 28 or decided on the space management server 12 side. In this case, the space data providing unit 12a stores an address of the user device 28 which is a transmission destination of a part of the space information, and part specifying information to specify the transmitted information in the primary peer management database 16. Note that, as shown in FIG. 3, the space database 18 includes space identification information and space information. The space information contains a position where an object is arranged, and an object reference to specify a shape or a pattern of the object.

The P2P network management unit 12b stores, when there is access to the space management server 12 from the user device 28, and the user device 28 requests participation in the P2P network 26, an address of the user device 28 in the P2P network management database 14, and returns addresses of all the user devices 28 constituting the P2P network 26, which have already been stored in the P2P network management database 14. Accordingly, the user device 28 newly participating in the P2P network 26 can notify the user devices 28 which have already participated in the P2P network 26 of its participation in the P2P network 26.

The space database updating unit 12c returns, in response to a request from the object server 22, part specifying information and an address of a primary peer stored in the primary peer management database. The primary peer is a user device 28 which has downloaded a part of space information specified by the part specifying information. Accordingly, the object server 22 can request the primary peer to provide a set of part specifying information and user information. When the object server 22 which has been provided with these items of information decides to update the space information by taking the item of information into consideration, the space management server 12 is requested to update the space information. In response to this request, the space database updating unit 12c updates the space information stored in the space database 18. In response to the request, space information of a new virtual 3-dimensional space is added.

Figure 4:
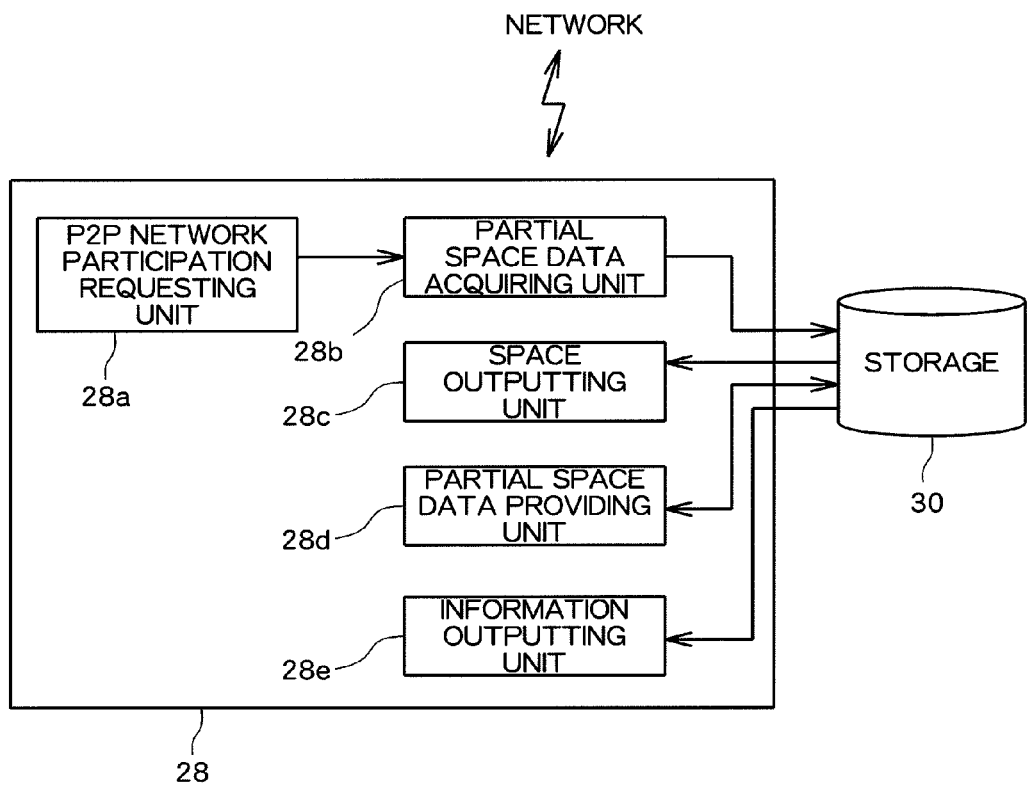
FIG. 4 A diagram illustrating a configuration of a user device (information terminal device).

Next, the user device 28 will be described. FIG. 4 is a functional block diagram of the user device 28. As shown in the figure, the user device 28 functionally includes a P2P network participation requesting unit 28a, a partial space data acquiring unit 28b, a space outputting unit 28c, a partial space data providing unit 28d, and an information outputting unit 28e.

The P2P network participation requesting unit 28a transmits an address of the user device 28 to the P2P network management unit 12b of the space management server 12 to request participation in the P2P network 26, and receives a list of addresses of the user devices 28 constituting the P2P network 26 from the space management server 12. This list is supplied to the partial space data acquiring unit 28b.

The partial space data acquiring unit 28b obtains a part of space information, and specifically requests a part of necessary space information from all the user devices 28 constituting the P2P network 26 according to the list supplied from the P2P network participation requesting unit 28a. Then, if any one of the user devices 28 has already downloaded the same part from the space management server 12, the partial space data acquiring unit 28b receives it from the user device 28. The partial space data acquiring unit 28b also receives information of an associated object from the same user device 28. These items of information are stored in the storage 30. On the other hand, if none of the user devices 28 has downloaded the requested part of the space information, the partial space data acquiring unit 28b requests the space management unit 12 to download the part. Accordingly, the space data providing unit 12a of the space management server 12 reads the requested part of the space information from the space database 18 to return it to the user device 28. The partial space data acquiring unit 28b stores the information received from the space management server 12 together with the part specifying information in the storage 30. According to an object reference contained in the received information, the partial space data acquiring unit 28b receives information of an object from the object server 22 to store it in the storage 30.

The space outputting unit 28c outputs space information, for example, displays an image of the virtual 3-dimensional space on a monitor, based on a part of the space information and the information of the object stored in the storage 30.

The partial space data providing unit 28d provides, when the user device 28 is a primary peer, a part of space information to the other user devices 28, thereby sharing the information with the other user devices. In other words, as described above, when a part of the space information is necessary, the user device 28 inquires about whether all the user devices 28 constituting the P2P network 26 have already stored the information. When the user device 28 is a primary peer, the partial space data providing unit 28d reads, in response to this inquiry, a requested part of the space information from the storage 30 to return it. Accordingly, a part of the space information downloaded from the space management server 12 can be shared with the other user devices 28. In this case, user information (age, sex, address, and the like of a user of the user device 28) is received from the other user devices 28 to which a part of the space information has been provided to be stored in the storage 30. The information outputting unit 28e returns the user information and part specifying information stored in the storage 30 in response to a request from the object server 22. Note that when the user device 28 receives a part of the space information stored in each of the storages 30 of the other user devices 28, the user information of the user device 28 is transmitted to the other user devices 28.

Figure 5:
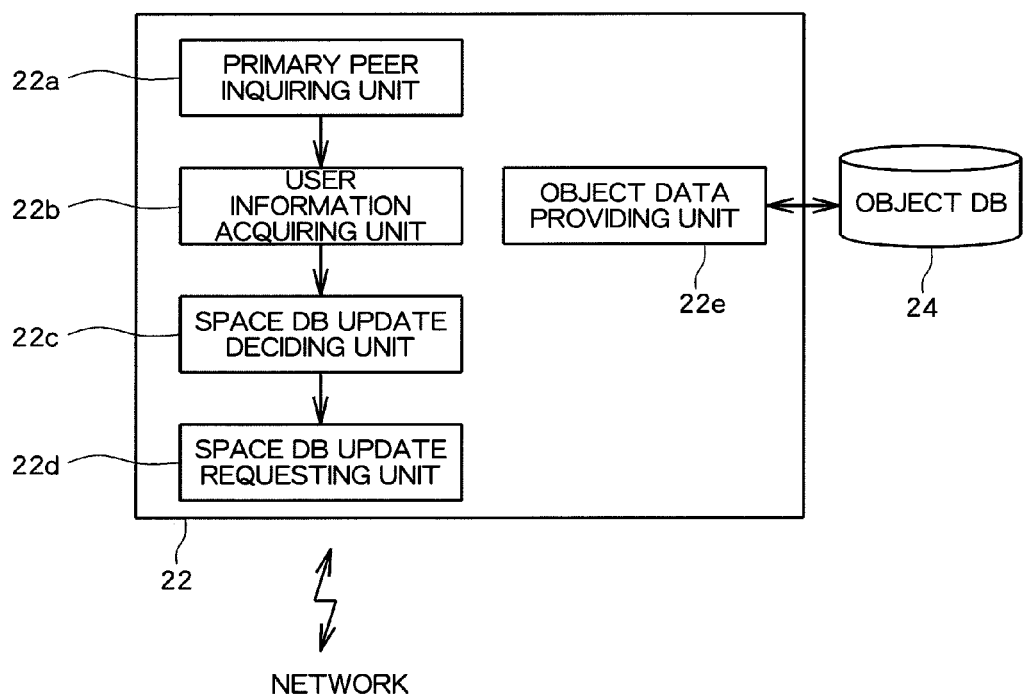
FIG. 5 A diagram illustrating a configuration of an object server (information updating server).

Next, the object server 22 will be described. FIG. 5 is a functional block diagram of the object server 22. The object server 22 functionally includes a primary peer inquiring unit 22a, a user information acquiring unit 22b, a space database update deciding unit 22c, a space database update requesting unit 22d, and an object data providing unit 22e. Main functions of the object server 22 are to transmit information of an object stored in the object database 24 to the user device 28, and to receive a set of user information and part specifying information from the user device 28 which is a primary peer, thereby requesting the space management server 12 to update space information according to contents of the set.

In response to a request from the user device 28, the object data providing unit 22e reads information of the object from the object database 24 to return it.

The primary peer inquiring unit 22a inquires to the space management server 12 about an address of the primary peer. Upon reception of the address of the user device 28 which is a primary peer as a reply, the primary peer inquiring unit 22a supplies it to the user information acquiring unit 22b. The user information acquiring unit 22b requests the user device 28 which is a primary peer to provide a set of user information and part specifying information. Accordingly, when the user device 28 returns the set of the user information and the part specifying information, the space database update deciding unit 22c analyzes contents of the set to decide whether it is necessary to update the space information, and contents to be updated. Alternatively, the space database update deciding unit 22c may output the set of user information and part specifying information on a monitor, and receive an entry of the need to update the space information and contents to be updated from a user of the object server 22. The space database update requesting unit 22d requests the space management server 12 to update the space information according to the contents decided by the space database update deciding unit 22c.

According to the information providing system 10 described above, the user device 28 receives a part of the space information from the space management server 12 to share it with the other user devices 28. Thus, a part of the space information can be provided to many user devices 28 without imposing any loads on the space management server 12. The user device 28 obtains user information of the other user devices 28 which share a part of the space information, and transmits this user information together with part specifying information for specifying the part of the space information which is shared information to the object server 22. Accordingly, information useful for updating the space information can be obtained without imposing any excessive loads on the space management server 12. Also, the object server 22 requests, according to contents of the information, the space management server 12 to update the space information. According to this embodiment, which part of the virtual 3-dimensional space is used by which user is grasped, and this information can be used for updating the space information. As a result, the space information can be updated very precisely.

Note that when the user device 28 which is a primary peer outputs user information, encrypted user information should preferably be output. In this case, preferably, the space database updating unit 12c of the space management server 12 manages encryption key data.

Lastly, a specific use example of the information providing system 10 will be described. According to this use example, a part of a 3-dimensional virtual city space is shared by a plurality of users (plurality of user devices 28). A contents provider that wishes to provide contents to the space updates space information to add an object of its own object server 22 to a relevant position.

The space management server 12 stores and manages space information of a virtual city including a plurality of movie theaters in the space database 18. Items of object information of a movie theater and a movie shown there are managed by each object server 22. It is presumed here that items of object information for movies about a car race and a war, and movie theaters showing the movies, are provided from the object server 22.

A user of a certain user device registers a P2P network 26 in the space management server 12 to constitute the P2P network 26 which shares the space information of the virtual city. In this case, information of the user device 28 and an ID of accessed space are recorded in the P2P network management database 14.

It is presumed that the user of the user device 28 accesses the movie theater showing the movie about the car race in the virtual city space. Necessary object data is designated by the space management server 12, and downloaded from the object server 22 to the user device 28. During downloading, in the space management server 12, the user device 28 records part specifying information to specify downloaded partial space and information of the user device 28 in the primary peer management database 16.

It is presumed that a new user device 28 participates to access the movie theater showing the movie about the car race. In this case, object information regarding the movie is downloaded from the primary peer, and user information of a user of the newly participating user device 28 is recorded as an access log in the user device 28 which is a primary peer.

In an object server 22 (object server 22 different from the object server 22 which provides the car race movie), advertisement information of sports cars is managed. The object server 22 obtains information to decide a place for putting up the advertisement via the space management server 12, which makes it possible to effectively decide a place where the sports car advertisement will be put up.

The object server 22 retrieves part specifying information which a movie object of the car race is referred to (concerning sports cars) from the space database 18 of the space management server 12. Then, to specify a user device 28 which holds user information regarding the part specifying information, the object server 22 obtains information of the primary peer which has downloaded the retrieved part specifying information from the primary peer management database 16.

Then, according to the information of the user device 28 obtained from the primary peer management database 16, the object server 22 accesses the user device 28 which is a primary peer to obtain user information stored in the user device 28. In this case, the user device 28 may be configured to provide user information based on a policy set by the user. In such a case, the user device 28 includes a policy control mechanism, and information designated by the user is provided to only a designated object server 22.

In the object server 22, when the obtained user information matches conditions such as the number of users who share the information, the space information of the space database 18 is updated to put up the sports car advertisement in front of the movie theater. Specifically, the space information is updated so that the movie theater and the sports car advertisement can simultaneously be displayed on the user device 28. In other words, position information and reference information of an advertisement object are added to the space database 18.

Further, upon updating of the space information, the space management server 12 notifies the user device 28 which is the primary peer which has downloaded the space information of the updating of the space information. The user device 28 that has been notified of the updating executes downloading again. Another user device 28 that has ever downloaded a part of the space information from the user device 28 which is the primary peer is notified of the updating from the user device 28 which is the primary peer. Note that when the user device 28 always obtains data from the primary peer for object displaying, needless to say, updating notification is unnecessary.

Objects constituting the space of the virtual city are provided from a plurality of object servers 22. The space management server 12 manages correspondence between the objects and positions of the virtual space, and its use for part specifying information of the virtual space. Thus, an arbitrary object server 22 can provide its own object information in association with items of information provided from the other object servers 22. Also, specific user information is managed by the user device 28 which actually shares data. Thus, loads on the space management server 12 can be reduced, and a right of final decision as to providing of user information can be given to the user of the user device 28.

The invention claimed is:

1. An information providing system, comprising:
   an information management server;
   an object server;
   a first information terminal device, and
   a second information terminal device, wherein:
   the information management server includes:
      a space database storing space information of a virtual three-dimensional space; and
      partial provided information transmitting means for transmitting a part of provided information to the first information terminal device, the part of the provided information including the space information; and
   the first information terminal device includes:
      partial provided information receiving means for receiving the part of the provided information transmitted by the partial provided information transmitting means;
      information sharing means for sharing the part of the provided information with the second information terminal device;
      user information acquiring means for acquiring user information of the second information terminal device, wherein the user information comprises information about a user's age or sex; and
      information outputting means for outputting the user information acquired by the user information acquiring means and part specifying information for specifying the part of the provided information,
   wherein the information management server updates the space information stored in the space database based on a combination of the part specifying information and the user information; and
   wherein the object server provides the part of provided information based on the part specifying information and the user information, determining whether the space information stored in the space database needs to be updated,
   wherein, if the object server determines that the user information included in the combination includes a number of users that is determined to match a predetermined number, then the information management server updates the space information stored in the space database related to the part specifying information so as to dispose an advertisement at a position specified by the part specifying information in the three-dimensional space and sends the updated part specifying information to the first information terminal device which sends the updated part specifying information to the second information terminal device,
   wherein the object server and the first and second user terminal devices are separate and distinct units in communication with one another via a network, and
   wherein said object server is a dedicated server to manage objects, the objects including said advertisement.

2. An information providing system according to claim 1, wherein the information sharing means transmits the part of the provided information to the second information terminal device.

3. An information providing system according to claim 2, further comprising a plurality of the information terminal devices, the plurality of the information terminal devices constituting a P2P network.

4. An information providing system according to claim 1, further comprising an information updating server for receiving the user information and the part specifying information outputted from the information outputting means, and requesting updating of the provided information according to contents of the user information and the part specifying information.

5. An information providing system according to claim 1, wherein the user information includes a user attribute.

6. The information providing system according to claim 1, wherein the object server downloads said user information from said first terminal device.

7. The information providing system according to claim 6, wherein the object server updates the information management server with respect to a location of the advertisement position.

8. The information providing system according to claim 1, wherein a third information terminal is notified of the updated space information by the first information terminal, and downloads the updated space information from the first information terminal.

9. A provided information updating method for an information providing system which includes an information management server for managing provided information, an object server to manage objects, a first information terminal device, and a second information terminal device, comprising:
   a partial provided information transmitting step of transmitting, by the information management server, a part of the provided information to the first information terminal device, the part of the provided information including space information of a virtual three-dimensional space stored in a space database of the information management server;
   a partial provided information receiving step of receiving, by the first information terminal device, the part of the provided information from the information management server;
   an information sharing step of sharing, by the first information terminal device, the part of the provided information with the second information terminal device;
   a user information acquiring step of acquiring, by the first information terminal device, user information of the second information terminal device, wherein the user information comprises information about a user's age or sex;
   an information outputting step of outputting, by the first information terminal device, the user information and part specifying information for specifying the part of the provided information; and
   an information updating step of updating, by the information management server, the provided information according to contents of the part specifying information and the user information outputted from the first information terminal device,
   wherein the information management server updates the space information stored in the space database based on a combination of the part specifying information and the user information,
   wherein the object server provides the part of provided information based on the part specifying information and the user information, determining whether the space information stored in the space database needs to be updated,
   wherein, if the object server determines that the user information includes in the combination includes a number of users that is determined to match a predetermined number, then the information management server updates the space information stored in the space database related to the part specifying information so as to dispose an advertisement at a position specified by the part specifying information in the three-dimensional space and sends the updated part specifying information to the first information terminal device which sends the updated part specifying information to the second information terminal device,
   wherein the object server and the first and second information terminal devices are separate and distinct units in communication with one another via a network, and
   wherein said object server is a dedicated server to manage objects, the objects including said advertisement.

10. A provided information updating method for an information providing system which includes an information management server for managing provided information, an object server for managing objects, a first information terminal device, and a second information terminal device, comprising:
   transmitting, by the information management server, a part of the provided information to the first information terminal device, the part of the provided information including space information of a virtual three-dimensional space stored in a space database of the information management server;
   receiving, by the first information terminal device, the part of the provided information from the information management server;
   sharing, by the first information terminal device, the part of the provided information with the second information terminal device;
   acquiring, by the first information terminal device, user information of the second information terminal device, wherein the user information comprises information about a user's age or sex;
   outputting, by the first information terminal device, the user information and part specifying information for specifying the part of the provided information; and
   updating, by the information management server, the provided information according to contents of the part specifying information and the user information outputted from the first information terminal device,
   wherein the information management server updates the space information stored in the space database based on a combination of the part specifying information and the user information,
   wherein the object server provides the part of provided information based on the part specifying information and the user information, determining whether the space information stored in the space database needs to be updated,
   wherein, if the object server determines that the user information included in the combination includes a number of users that is determined to match a predetermined number, then the information management server updates the space information stored in the space database related to the part specifying information so as to dispose an advertisement at a position specified by the part specifying information in the three-dimensional space and sends the updated part specifying information to the first information terminal device which sends the updated part specifying information to the second information terminal device,
   wherein the object server and the first and second user terminal devices are separate and distinct units in communication with one another via a network, and
   wherein said object server is a dedicated server to manage objects, the objects including said advertisement.

* * * * *